(12) United States Patent
Laflamme et al.

(10) Patent No.: US 7,419,322 B2
(45) Date of Patent: Sep. 2, 2008

(54) FLUID DISPENSING DEVICE WITH METERED DELIVERY

(75) Inventors: Roger J. Laflamme, Enfield, CT (US); Robert W. Pekar, Florence, MA (US)

(73) Assignee: Poly-D LLC, Torrington, CT (US)

( * ) Notice: Subject to any disclaimer, the term of this patent is extended or adjusted under 35 U.S.C. 154(b) by 445 days.

(21) Appl. No.: 11/074,817

(22) Filed: Mar. 8, 2005

(65) Prior Publication Data

US 2005/0199651 A1 Sep. 15, 2005

Related U.S. Application Data

(60) Provisional application No. 60/551,993, filed on Mar. 10, 2004.

(51) Int. Cl.
 A46B 11/02 (2006.01)
 B67D 5/40 (2006.01)
(52) U.S. Cl. .................. 401/188 R; 401/205; 222/372; 222/373; 222/383.1
(58) Field of Classification Search ............. 401/188 R, 401/205, 206, 270, 278; 222/372, 373, 383.1, 222/385
See application file for complete search history.

(56) References Cited

U.S. PATENT DOCUMENTS

| | | | |
|---|---|---|---|
| 886,984 A | 5/1908 | Jopling | |
| 1,217,054 A | 2/1917 | Pearman | |
| 1,941,745 A | 1/1934 | Higley | 221/98 |
| 2,714,475 A | 8/1955 | Roehrich | 221/501 |
| 3,617,139 A | 11/1971 | Ross | 401/206 |
| 3,981,106 A | 9/1976 | Gallo | 51/358 |
| 4,004,854 A | 1/1977 | Breer, II | 401/205 |
| 4,074,944 A * | 2/1978 | Xavier | 401/182 |
| 4,188,989 A | 2/1980 | Andersen | |
| 4,886,388 A | 12/1989 | Gulker et al. | 401/148 |
| 4,889,441 A | 12/1989 | Tice | |
| 4,890,744 A | 1/1990 | Lane, Jr. et al. | |
| 5,074,765 A | 12/1991 | Pekar | |

(Continued)

FOREIGN PATENT DOCUMENTS

DE 4030851 4/1992

(Continued)

Primary Examiner—David J Walczak
(74) Attorney, Agent, or Firm—Barlow, Josephs & Holmes, Ltd.

(57) ABSTRACT

The fluid dispensing device (10) includes a container (20) with an interior fluid storage region (22) therein. A flexible metering housing (26) is disposed in fluid communication with the fluid storage region (22) a first one-way valve (30) disposed between the container (20) and the flexible metering housing (26). One way flow from the interior fluid storage region (22) of the container (20) fills the predetermined volume of the metering chamber (32) with fluid by vacuum action when a button (36) is depressed and then released. A second valve (40) is in fluid communication with the metering housing (26) and permits one-way fluid flow from the metering chamber (32) to the exterior outer region of the container (20) when the metering housing (26) is depressed again. Each time the metering housing (26) is depressed a substantially equal volume of fluid (24) is dispensed from the container (20). An additional foam layer (12) on the outside of container (20) facilitates dispersion and delivery of the fluid (24).

19 Claims, 5 Drawing Sheets

U.S. PATENT DOCUMENTS

| | | | | |
|---|---|---|---|---|
| 5,114,255 | A | 5/1992 | Villarreal | 401/45 |
| 5,261,570 | A | 11/1993 | Hippely et al. | |
| 5,372,487 | A | 12/1994 | Pekar | |
| 5,387,207 | A | 2/1995 | Dyer et al. | 604/369 |
| 5,441,345 | A | 8/1995 | Garvey et al. | |
| 5,482,980 | A | 1/1996 | Pcolinsky | 521/130 |
| 5,555,673 | A | 9/1996 | Smith | 47/1.5 |
| 5,700,245 | A | 12/1997 | Sancoff et al. | 604/145 |
| 5,704,723 | A | 1/1998 | Salisian | 401/8 |
| 5,842,607 | A | 12/1998 | Snider | 222/145.6 |
| 5,865,554 | A | 2/1999 | Lin | 401/206 |
| 5,934,296 | A | 8/1999 | Clay | 132/320 |
| 5,944,032 | A | 8/1999 | Masterson | 132/290 |
| 6,183,154 | B1 | 2/2001 | Coe | 401/196 |
| 6,210,064 | B1 | 4/2001 | White et al. | 401/279 |
| 6,302,607 | B1 | 10/2001 | Burrowes et al. | 401/18 |
| 6,419,118 | B1 | 7/2002 | Rees et al. | |
| 6,623,201 | B2 | 9/2003 | Brumlik | 401/279 |
| 6,629,799 | B2 * | 10/2003 | Flores, Jr. | 401/270 |
| 6,641,307 | B2 | 11/2003 | Matsuda et al. | |
| 7,156,132 | B2 | 1/2007 | O'Dougherty et al. | |
| 7,159,742 | B2 | 1/2007 | Lee | |
| 2002/0085873 | A1 | 7/2002 | Katsandres et al. | 401/6 |
| 2006/0072858 | A1 | 4/2006 | Kurosawa et al. | |
| 2006/0255068 | A1 | 11/2006 | Genosar | |

FOREIGN PATENT DOCUMENTS

| | | |
|---|---|---|
| JP | 6293348 | 10/1994 |
| WO | 0176972 | 10/2001 |

\* cited by examiner

FLUID DISPENSING DEVICE WITH METERED DELIVERY

CROSS-REFERENCE TO RELATED APPLICATIONS

This application claims priority from prior U.S. Provisional Application Ser. No. 60/551,993 filed on Mar. 10, 2004.

BACKGROUND OF THE INVENTION

This invention relates generally to dispensing devices and packages. More specifically, the present invention relates to metering devices that can controllably dispense fluid media from a source of fluid media.

Various types of fluid material and media are employed for different purposes through commerce and industry. For example, there are various products in the personal care, home care, air care, transportation care, and food industries that require some type of dispensing of a fluid material from a source of such material. When this material is sold in commerce, it must be contained and stored in some type of container. When that product is used, it must be dispensed from its storage container to a location for use.

In the prior art, there are many different types of dispenses for delivering fluid material. For example, a flexible container body with a nozzle tip is commonly provided for such a purpose. An application of such use is for the dispensing of ketchup where the container body is squeezed by the user to urge the fluid material out from the nozzle tip and accurately to a desired location. The amount of fluid delivered is determined by the how much the user squeezed the container body. However, this yields erratic results where more or less fluid material is delivered on each successive squeeze of the container body. Also, the container must be held upright to avoid leakage because no valves are employed.

In another example of a prior art dispensing device, a flexible container holds a volume of fluid material to be delivered. A single one-way check valve is provided as an exit port from the flexible container. When the flexible body is squeezed, the material is urged out under pressure through the valve.

There has also been a desire to not only dispense the fluid material but also to help apply them, such as to a surface. In the prior art, the squeezable container bodies have been equipped with some type of applicator head for this purposes. For example, in the personal care industry, body wash devices commonly include some type of squeezable container body and an abrasive applicator material, such as fabric or foam, applied thereon. Thus, when the fluid material is present outside the container body, the applicator assists in spreading the material on the body of the user by spreading the fluid within the applicator for better and more even distribution thereof. Applicators are particularly useful for even distribution in personal care industry, such as shoe polish, to ensure a quality even and smooth coat.

There have been attempts in the prior art to provide a dispenser that can easily deliver fluid material to an applicator positioned about a container body. These prior art devices employ, for example, spring-loaded buttons that open up an exit port in the main container body to permit flow to an outer applicator material layer. This is in contrast to requiring the user to squeeze the entire body of the container. However, these devices are incapable of delivering a substantially equal dose of fluid at each dispensing operation because they simply open up the container body and permit the fluid to flow to the applicator material by gravity. As a result, the fluid material must exit at a lower side of the container. Therefore, it is not possible to dispense fluid on more than one side of the container or in a direction opposite to that of gravity. To dispense fluid material without concern for gravity, squeezable container bodies must be employed in the prior art which have all of the disadvantages, as described above.

In view of the foregoing, the fluid dispensing and devices of the prior art suffer from various disadvantages that make them difficult and awkward to use with unexpected results. Therefore, there is a need for a fluid dispenser to be easy to operate. There is a further need for a fluid dispenser to be capable of delivering a metered dose of fluid upon each dispensing operation for expected flow for better application of the fluid material. There is also a need for such a dispenser to be gravity independent. There is an additional need for the fluid to be capable of being delivered to exit at any point on the surface of container. There is a further need for a dispenser to include an applicator material for even distribution and even application of the fluid material, as desired.

SUMMARY OF THE INVENTION

The present invention preserves the advantages of prior art dispensing devices. In addition, it provides new advantages not found in currently available devices and overcomes many disadvantages of such currently available devices.

The invention is generally directed to a novel and unique dispenser for delivering a substantially equal metered dose of fluid material upon each dispensing operation with an optional applicator for even distribution of the dispensed fluid material.

The fluid dispensing device includes a container with an interior fluid storage region therein. A flexible metering housing is disposed in fluid communication with the fluid storage region a first one-way valve disposed between the container and the flexible metering housing. One way flow from the interior fluid storage region of the container fills the predetermined volume of the metering chamber with fluid by vacuum action when the flexible metering housing is depressed and then released. A second valve is in fluid communication with the metering housing output port and permits one-way fluid flow from the metering chamber to the exterior outer region of the container when the metering housing is depressed again. Each time the metering housing is depressed a substantially equal volume of fluid is dispensed from the container. An additional foam layer on the outside of container facilitates dispersion and delivery of the fluid.

It is therefore an object of the present invention to provide a fluid dispensing device that can deliver a substantially equal volume of fluid material from each dispensing operation.

It is an object of the present invention to provide a fluid dispensing device that is insensitive to gravity.

It is a further object of the present invention to provide a fluid dispensing device that includes an applicator to ensure even delivery of the fluid material.

Another object of the present invention is to provide a fluid dispensing device that can deliver fluid flow at any point from the device.

It is a further object of the present invention to provide a fluid dispensing device that can deliver fluid flow at multiple locations from the device.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
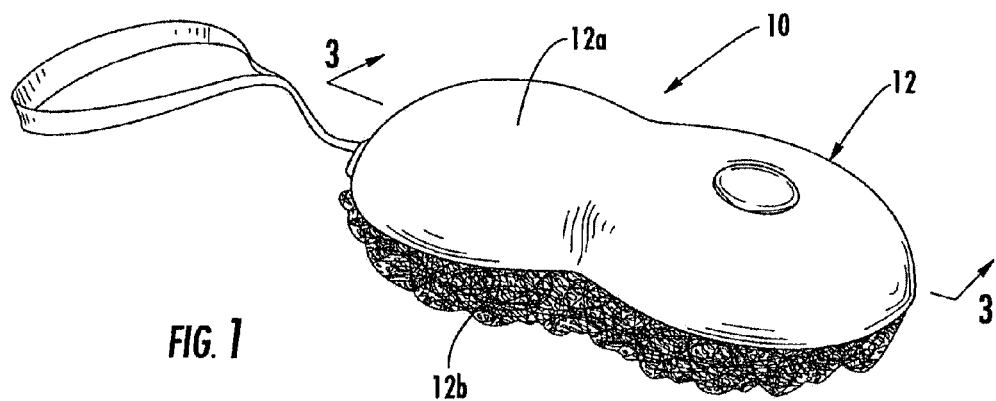
FIG. 1 is a top perspective view of the dispensing device of the present invention.
Figure 2:
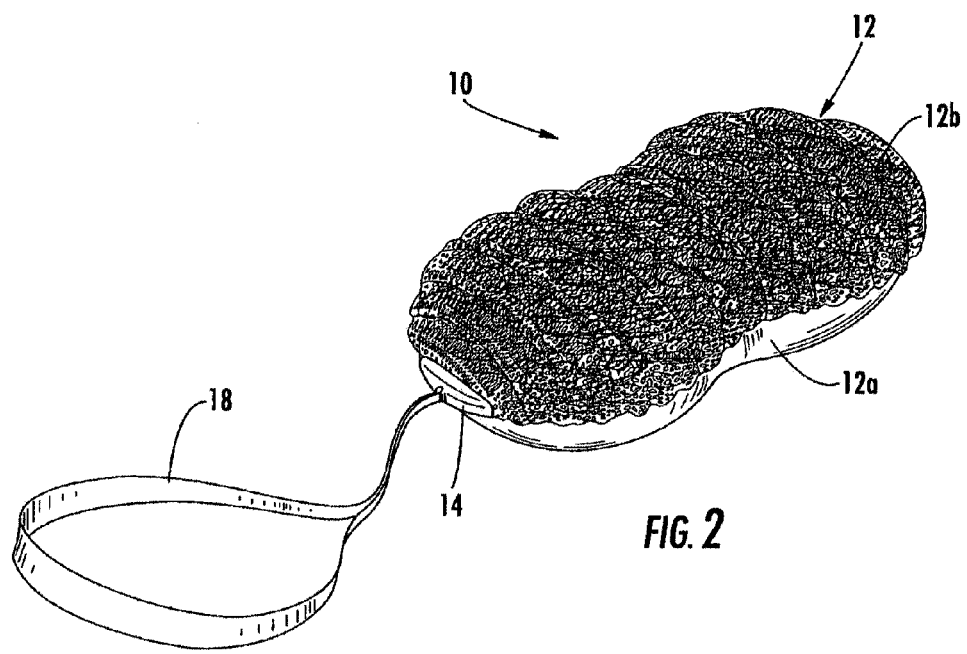
FIG. 2 is a bottom perspective view of the dispensing device of the present invention.

Referring first to FIGS. 1 and 2, the dispensing device 10 of the present invention is shown to include an outer covering, generally referred to as 12 which serves as an applicator material. This applicator material 12 can be formed of any type of material to suit the application at hand. For example, as seen in FIGS. 1 and 2, the cover 12 is preferably formed of two different types of material 12a, 12b to serve two purposes when in use. Preferably, the top section 12a is of a foam material while the bottom section 12b is of a mesh or "pouf" material. The top section 12a can be secured to the bottom section 12b by, for example, welding. A snap-fit cover 14 seals a re-fill port 16, as will be described in more detail in connection with FIG. 3. A hang strap or cord 18 can also be provided. The configuration of the applicator 12 is just one of many different types of applications of the present invention which will be discussed in more detail below.

Figure 3:
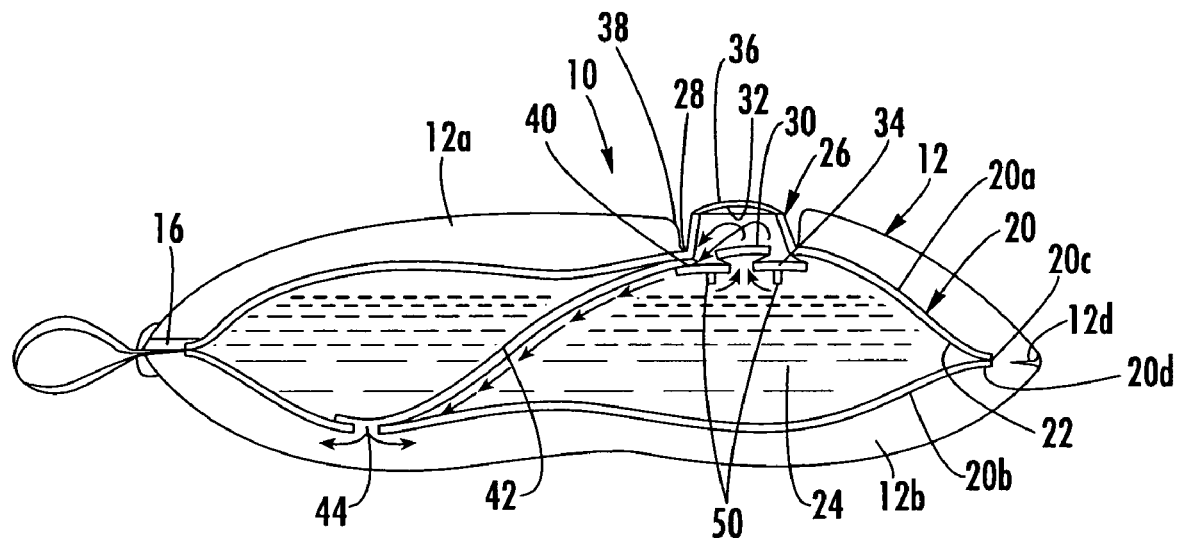
FIG. 3 is a cross-sectional view through the line 3-3 of FIG. 1.

Turning now to FIG. 3, a cross-sectional view through the line 3-3 of FIG. 1 is shown to illustrate the internal construction of the dispensing device 10 of the present invention. A container body 20 is provided which includes a fluid storage region 22 that contains a volume of fluid material 24 therein. The container 20 is preferably made of a flexible material, such as plastic or nylon. Thus, as fluid material 24 is evacuated from within the container body 20, it will collapses gradually for a compact structure.

A flexable metering housing 26 is provided at a first opening 28 of the container body 20. The metering housing 26 includes an intake one-way valve 30, such as a check valve, to pull fluid 24 from the fluid storage region 22 of the container body 20 into a metering chamber 32 of a predetermined size. Any type of valve can be used to suit the given application. The intake valve 30 is positioned in a base plate 34 of the metering housing 26. Thus, fluid 24 can only flow in one way from the fluid storage region 22 into the metering chamber 32. The metering chamber 32 is defined by a flexible membrane 36 in the form of a button or bulb which is accessible and manipulateable through a gap 38 in the applicator material 12. The button 36 is preferably clear to provide an indicator to the consumer when the metered dosage of fluid material 24 is ready for delivery.

An output valve 40, which may also be a one-way check valve, is provided in fluid communication with the metering chamber 32 of the metering housing 26. Thus, the fluid residing in the metering chamber can only exit through the output valve 40. Also, a fluid conduit 42 is also provided to direct the exit of fluid 24 at any location through the container body. Preferably, as seen in FIG. 3, the fluid conduit 42 connects the output valve 40 of the metering housing 26 to an exit port 44 located on the bottom of the container body. This permits the metering housing 26 to be on an opposite side as the side through which the fluid 24 exits. The fluid conduit 42 can be directed and located to exit at any point through the container body 20 depending on the application at hand. Also, the output valve 40 may be located at the exit port 44, as an alternative depending on the requirements of the application.

Still referring to FIG. 3, the operation of the dispensing device 10 is further explained. The button 36 of the metering housing 26 is depressed to initiate a vacuum operation. More specifically, when the button 36 is further released, fluid 24 is pulled from the fluid storage region 22 of the container body 20 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed and the application therefor and the desired dosage volume.

A further depression of the button 36 urges the measured volume of fluid 24 within the metering chamber 32 to be exiting out through the output valve 40 of the metering housing 26. This known amount of fluid material 24 is then either directly routed to the applicator 12 for use or through a fluid conduit 42, as seen in FIG. 3, for more targeted introduction into the applicator 12. In this case, it is preferred that the metered volume of fluid material 24 be routed to the bottom of the container body 20 for dispersion into the applicator portion 12b on the bottom surface thereof. For example, this configuration is particularly well-suited for dispensing body wash for bathing purposes. Other applications may require different exit and introduction locations into the applicator material 12.

Figure 4:
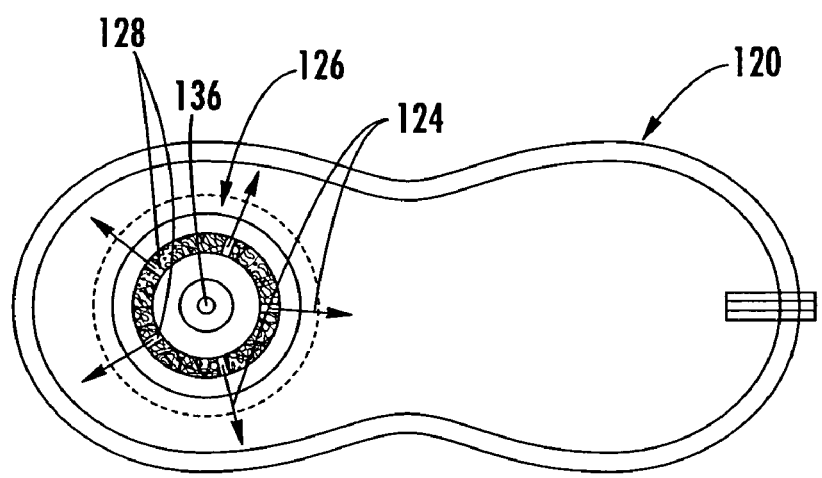
FIG. 4 is a top plan view of a first alternative embodiment of the present invention.

In FIG. 4 an alternative construction of the container 120 with modified metering housing 126 is shown. In this embodiment, an array of output valves 128 is positioned radially about the periphery of the metering housing 126 to deliver fluid material 124 directly to the applicator material (not shown in FIG. 4 for ease of explanation) on the same side thereof without employing a fluid conduit 42 that is routed through the interior of the container body 20. This radial delivery pattern is well-suited for use in application devices requiring simultaneous dispersion of contents around the metering housing, such as for applying skin conditioner. Further, a plurality of conduits may be connected to the output valve at one end and respectively to a plurality of exit ports defined by the container.

Figure 5:
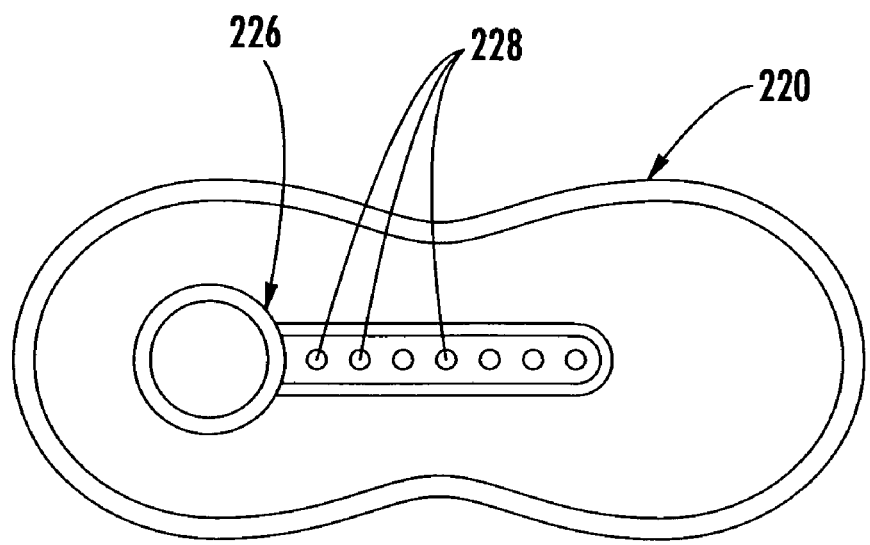
FIG. 5 is a top plan view of a second alternative embodiment of the present invention.

Still further, FIG. 5 illustrates another alternative construction of a container 220 with modified metering housing 226 of the present invention where an array of output valves 228 is positioned linearly across the top surface of the container body 220 to deliver fluid material directly to the applicator material (not shown in FIG. 5 for ease of explanation) on the same side thereof without employing a fluid conduit. This linear delivery pattern is well-suited for use as an applicator that applies fluid in a linear stroke-based manner along the longitudinal axis of the device.

In accordance with the present invention, the direction of the delivery of the fluid material 24 can be easily modify to suit the application at hand. In certain applications, it is desirable that the applicator material 12, located on the top and the bottom of the container body 20, receive fluid material in an evenly distributed fashion. As shown above, the fluid material 24 can be directed out from any location on the container 20 to deliver the fluid as desired. It is frequently desirable that the fluid 24 be able to passively flow from one side 20a of the container 20 to the opposing side 20b of the container 20, particularly at the edges 20c thereof.

Referring back to FIG. 1, an efficient method of manufacturing a quality dispensing device 10 is to employ heat welding to construct the container 20 and the applicator material 12 thereon. For example, a top portion 20a is typically heat welded to a bottom portion 20b about their periphery 20c to form a container 20 with an interior fluid storage region 22 therein. The applicator material 12 is similarly secured to the container 20 by heat welding or other similar process, such as gluing, either about its periphery or its entire contact surface with the container 20.

If a heat welding seam 20d about the periphery 20c of the container 20 is employed, it will reduce the flow and wicking action of the fluid 24 in the applicator material 12a on one side to the applicator material 12b on the other side and vice versa. Thus, fluid 24 must travel over the seam 20d of the container and seam 12d of the applicator material 12 to be present on the opposing side. This seam 12d, 20d prevents the fluid 24 from freely flowing from the front of the container 20 to the back and vice versa.

Figure 6:
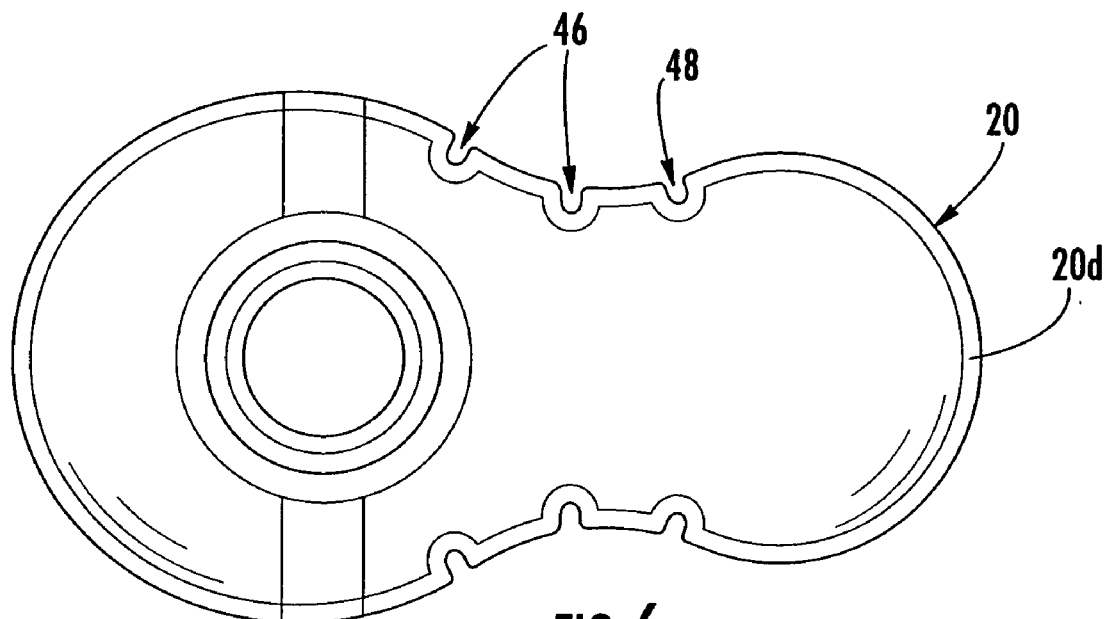
FIG. 6 is a top plan view of the dispensing device of the present invention showing flow enhancing notches.

FIG. 6 illustrates a modification to the container 20 which is within the scope of the present invention to address the problem indicated above. More specifically, a number of notches 46 are formed in the peripheral edge 20d of the container 20 to permit flow of fluid material 24 easily from one side of the container 20 to the other. When the applicator material 12 is heat sealed to the container at its peripheral edge to form a seam 12d, a number of pass-through apertures 48 are formed between the seam 20d, 12d and the applicator material 12 to permit free flowing travel of fluid material 24 from one side of the device 10 to the other and back without having to travel over the peripheral seam 12d, 20d.

Figure 7:
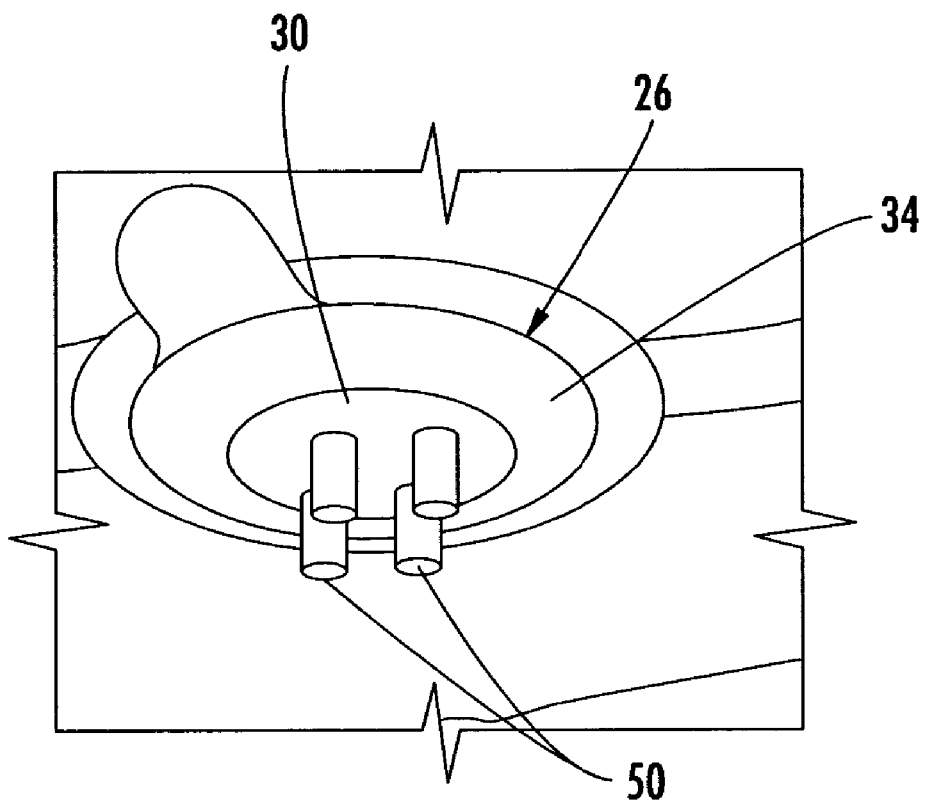
FIG. 7 is a close-up perspective view of the metering housing with stand-off legs.
Figure 8:
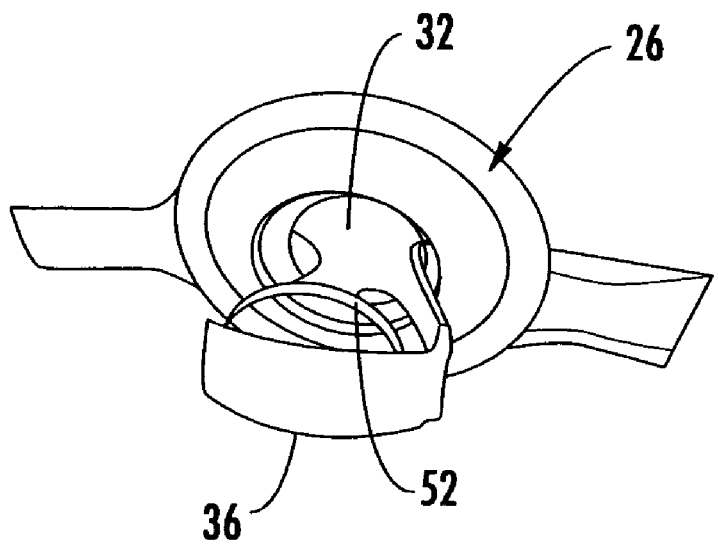
FIG. 8 is a close-up perspective view of the metering housing with coil spring.

Turning now to FIGS. 3, 7 and 8, further enhancements to the metering housing 26 construction is are shown in detail. As seen in FIGS. 3 and 7, a number of stand-off legs 50 emanate downwardly from the base plate 34 of the metering housing 26. These legs 50 prevent the base plate 34 from completely bottoming out and block flow of fluid material 24 into the intake valve 30. The stand-off legs 50 are particularly useful when the volume of fluid material 24 left in the container 20 is running low and the container 20 is becoming relative flat in configuration. In this situation, there is a possibility that the aforesaid bottoming out may occur. However, the use of the stand-off legs 50 of FIGS. 3 and 7 prevent this from occurring.

FIG. 8, with reference back to FIG. 3, illustrates a further modification of the metering housing 26 to ensure that maximum suction is achieved and that the entire metering chamber 32 is filled upon each depression and release of the button 36. A spring-biasing structure 52 resides within the button or bulb structure 36 of the metering housing 26. Thus, the button 36 recovers quickly while providing a strong suction or vacuum to fill the interior of the metering chamber 32 with the desired metered volume of fluid material 24. A coil spring is preferred for the spring-biasing structure 52 but other spring-biasing structures, such as leaf springs and foam material may be employed for this purpose.

Figure 9:
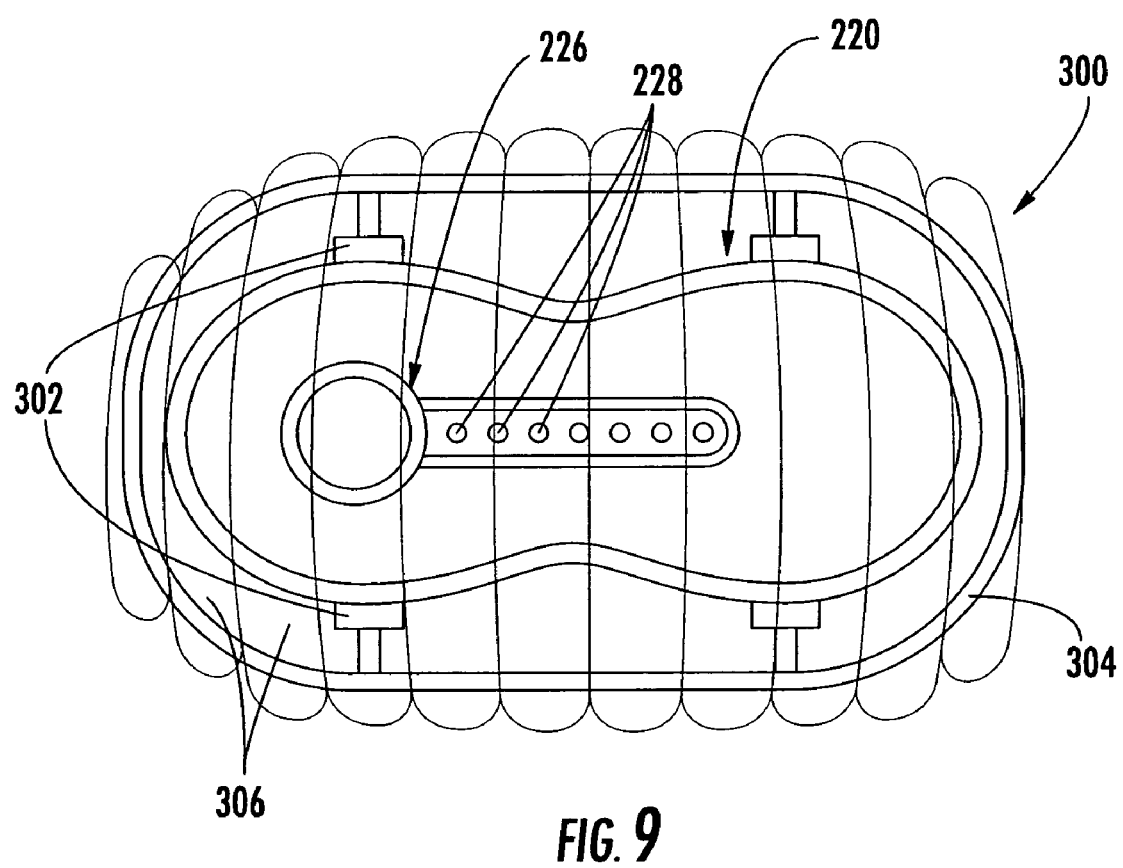
FIG. 9 is a top plan view on an alternative embodiment of the present invention.

FIG. 9 illustrates a further alternative embodiment 300 of the present invention where a container, such as container 220 or 120, includes a series of tabs 302 that emanate outwardly from the container 220. An outer frame or skeleton 304 is connected to the container 220 via the tabs 302. Applicator material 306, such as "poof" or fabric material, is then attached to the frame 304 with the container 220 residing therein. This embodiment 300 is particularly well-suited to permit free flowing of fluid material about the dispenser 300.

The dispensing device 10 of the present invention has a wide array of applications of use to take advantage of the unique metered dosage capability of the present invention. Virtually any dispenser with any type of applicator material or combinations of applicator materials in different configurations can employ the present invention.

For example, the personal care industry has particular application in the controlled and metered dispensing of bath and shower gels. Also, medicines, cosmetics, hair care products, such a shampoos, skin care products, such as lotions, insect repellants and sunscreen products can employ the present invention.

Also, various home products can be delivered in a device 10 according to the present invention. These include products for furniture cleaning and polishing, tub and shower cleaning, floor cleaning and polishing, window cleaning, odor elimination, oven cleaning, laundry cleaning and apparel treatment. Also, air treatment device can employ the present invention.

Still further, cleaning products can be dispensed in a controlled fashion, such as those for cleaning cars, bikes, planes and trucks. The food industry has numerous potent ional applications, particularly for the dispensing of condiments, sauces and vitamins.

To employ the dispensing device 10 of the present invention, the size and construction of the metering housing 26 as well as the positioning of where the fluid material 24 is delivered to the surface of the device can be easily modified to suit the given application. The materials used for the container 20 and the metering housing 26, while preferably flexible plastic, can be any suitable material for the application at hand. Also, the container 20 can be made of a different material than the metering housing 26.

Most importantly, the modification of the present invention to suit a given application relates particularly to the nature and configuration of the applicator material 12 itself.

The applicator material 12 can be foam, such as open cell foam, fabric, blended material, co-extruded material and combinations thereof. It should be understood that these materials are just examples of the types of materials that can be used in connection with the dispenser 10 of the present invention. The specific material is determined by the given application and the type of material to be dispensed.

Thus, when fluid material 24 is dispensed within the foam, the fluid 24 will tend to equilibrate the moisture by moving the moisture from a point of high moisture to a point of low moisture. This wicking action causes the fluid 24 to naturally propagate through the applicator material 12. Since there is an absence of applicator material 12 at the periphery, the notches 46 and pass-through apertures 48 of FIG. 6, facilitates the wicking action from one side of the device 10 to the other, if necessary in that application.

Non-woven materials or fibers may also be employed as the material for the applicator 12 on one or both sides of the device. For example, reticulated foam may also be employed. These materials would be well-suited as applicators 12 for more harsh chemicals, such as tire cleaner and paint remover where toughness is required.

Also, more abrasive material can be provided on one side of the device for more aggressive cleaning, for example, while the opposing side has a polishing type surface.

In general, the size, density and wicking action of the cells and overall size of the applicator 12 can be modified to suit the particular fluid to be applied.

In summary, a new and novel dispenser 10 is provided that can deliver consistent metered dosages such fluid material 24. The dispenser 10 has a greatly improved construction where the fluid material 24 is even distributed throughout the applicator material 12 for a more efficient and more effective fluid dispensing.

It would be appreciated by those skilled in the art that various changes and modifications can be made to the illustrated embodiments without departing from the spirit of the present invention. All such modifications and changes are intended to be covered by the appended claims.

What is claimed is:

1. A fluid dispensing device, comprising:
   a container having an outer surface and a first opening; the container defining an interior fluid storage region therein, and an exterior outer region;
   a flexible metering housing, having a metering chamber therein with a predetermined volume, disposed in fluid communication with the fluid storage region;
   an intake valve disposed between the container and the flexible metering housing and permitting unidirectional fluid flow from the interior fluid storage region of the container into the metering chamber thereby filling the predetermined volume of the metering chamber;
   an output valve, in fluid communication with the metering housing and permitting unidirectional fluid flow from the metering chamber to the exterior outer region of the container of a volume of fluid substantially equal to the predetermined volume of the flexible metering housing; and
   wherein the container is made from a flexible material, and wherein the flexible material of the container and the unidirectional flow of the intake valve cause the container to collapse as fluid is evacuated from within the container such that the fluid dispensing device is gravity independent.

2. The fluid dispensing device of claim 1, further comprising:
   means for dispersing fluid about the exterior outer region of the container.

3. The fluid dispensing device of claim 2, wherein the container defines at least one notch therein.

4. The fluid dispensing device of claim 2, wherein the means for dispersing is at least one area of foam positioned about the container.

5. The fluid dispensing device of claim 2, wherein the means for dispersing is a layer of fabric positioned about the container.

6. The fluid dispensing device of claim 1, further comprising:
   a fluid conduit connected at one end to the output valve and at the other end to an exit port defined by the container.

7. The fluid dispensing device of claim 6, wherein the first opening and the exit port are on opposing sides of the container from one another.

8. The fluid dispensing device of claim 6, wherein the fluid conduit is routed through the interior fluid storage region of the container.

9. The fluid dispensing device of claim 6, further comprising:
   a plurality of fluid conduits connected to the output valve at one end and respectively to a plurality of exit ports defined by the container.

10. The fluid dispensing device of claim 1, further comprising:
    a fluid conduit disposed between the metering housing and the output valve.

11. The fluid dispensing device of claim 1, further comprising:
    a re-fill port connected to the container.

12. The fluid dispensing device of claim 1, further comprising a plurality of output valves.

13. The fluid dispensing device of claim 1, wherein the intake valve and the output valve are one-way check valves.

14. The fluid dispensing device of claim 1, further comprising a strap connected to the container.

15. The fluid dispensing device of claim 1 further comprising:
    standoff means connected to the metering housing and proximal to the intake valve to prevent the intake valve from being blocked.

16. The fluid dispensing device of claim 15, wherein the standoff means is at least one leg.

17. The fluid dispensing device of claim 15, wherein the standoff means is a spring.

18. The fluid dispensing device of claim 1, further comprising:
    a frame attached to the container; and
    applicator material attached to the frame.

19. The fluid dispensing device of claim 1, wherein the output valve is located at an exit port.

* * * * *